US012188782B2

(12) United States Patent
Carbune et al.

(10) Patent No.: US 12,188,782 B2
(45) Date of Patent: Jan. 7, 2025

(54) DYNAMIC GENERATION AND SUGGESTION OF TILES BASED ON USER CONTEXT

(71) Applicant: GOOGLE LLC, Mountain View, CA (US)

(72) Inventors: Victor Carbune, Zurich (CH); Kevin Allekotte, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/057,077

(22) PCT Filed: Dec. 19, 2019

(86) PCT No.: PCT/US2019/067562
§ 371 (c)(1),
(2) Date: Nov. 19, 2020

(87) PCT Pub. No.: WO2021/126218
PCT Pub. Date: Jun. 24, 2021

(65) Prior Publication Data
US 2022/0316917 A1    Oct. 6, 2022

(51) Int. Cl.
*G01C 21/00*    (2006.01)
(52) U.S. Cl.
CPC ..... *G01C 21/3881* (2020.08); *G01C 21/3889* (2020.08); *G01C 21/3893* (2020.08)
(58) Field of Classification Search
CPC ............ G01C 21/3881; G01C 21/3889; G01C 21/3893; G06F 16/29
See application file for complete search history.

(56) References Cited

U.S. PATENT DOCUMENTS

| 8,977,719 B1* | 3/2015 | Miller ................... G06F 21/16 709/219 |
| 2012/0078512 A1 | 3/2012 | Schunder et al. |
| 2013/0080594 A1 | 3/2013 | Nourse et al. |
| 2013/0124563 A1 | 5/2013 | CaveLie et al. |
| 2013/0332069 A1 | 12/2013 | Schunder et al. |

(Continued)

FOREIGN PATENT DOCUMENTS

| CN | 106484693 A | 3/2017 |
| CN | 110059143 A | 7/2019 |

(Continued)

OTHER PUBLICATIONS

International Search Report and Written Opinion for Application No. PCT/US2019/067562, dated Jul. 23, 2020.

(Continued)

*Primary Examiner* — Nga X Nguyen
(74) *Attorney, Agent, or Firm* — MARSHALL, GERSTEIN & BORUN LLP

(57) ABSTRACT

To provide dynamic generation and suggestion of map tiles, a server device receives from a user device a request for map data for a particular geographic region. The server device obtains a set of user contextual data and a set of candidate map tiles associated with the particular geographic region. The server device then selects one or more of the set of candidate map tiles based on the set of user contextual data, and transmits the one or more selected map tile to the user device for display.

15 Claims, 10 Drawing Sheets

(56) References Cited

U.S. PATENT DOCUMENTS

| | | | |
|---|---|---|---|
| 2014/0310299 A1* | 10/2014 | Nourse | G06F 16/9574 707/758 |
| 2014/0344296 A1* | 11/2014 | Chawathe | G06F 16/9537 707/769 |
| 2018/0189323 A1* | 7/2018 | Wheeler | G06F 16/29 |
| 2019/0212977 A1 | 7/2019 | Sicurelli, III et al. | |
| 2020/0134054 A1* | 4/2020 | Viswanathan | G06F 16/29 |
| 2021/0081440 A1* | 3/2021 | Bruce | H04L 67/52 |

FOREIGN PATENT DOCUMENTS

| | | |
|---|---|---|
| EP | 2 958 033 A1 | 12/2015 |
| WO | WO-2019/072526 A1 | 4/2019 |

OTHER PUBLICATIONS

First Office Action for Chinese Application No. 201980044362.1, dated Jul. 30, 2024.

\* cited by examiner

DYNAMIC GENERATION AND SUGGESTION OF TILES BASED ON USER CONTEXT

FIELD OF THE DISCLOSURE

The present disclosure relates to context-aware map tile generation and suggestion and, more particularly, to using user contextual data to identify optimal map tiles for display to the user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including mobile phones, car navigation systems, hand-held global positioning system (GPS) units, and computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example.

SUMMARY

To suggest and/or generate a map tile for display to a user, the server device must first receive a request for map data from the user (via a user device). Generally speaking, the request for map data may be an indication that a user is scrolling over a particular geographic region of a map. The request for map data may also include an indication of a particular geographic region specified by the user. For example, a user may access a mapping service and enter a geographic region into a search function of the mapping service in order to retrieve map data corresponding to the geographic region. Similarly, a user may be driving along a highway when she requests map data by selecting a route, scrolling across the map to a destination region, and/or performing other map-based services.

In any event, once the user provides the request for map data, the server executing the mapping service may retrieve the map data corresponding to the geographic region indicated in the request. The map data corresponding to the geographic region may include a variety of information, such as names of cities and towns, landmarks, roads, and any other relevant information. Map data may be provided for a map tile which represents at least a portion of a geographic region corresponding to the request. Several map tiles each representing the same geographic region may have different view types. The view type for the map tile may be selected based on the interests of the user. For example, the map tile may display the geographic region in a terrain view that includes indications of topography corresponding to the geographic region. The map tile may also display the geographic region in a satellite view that provides a realistic image of the geographic region as viewed from an overhead perspective. Thus, if a user desires to know how mountainous the geographic region is, the terrain view may be the most helpful map tile for display.

Prior to providing a map tile for display, the system may obtain a set of user contextual data in order to ascertain a map tile the user may prefer to view. For example, the set of user contextual data may indicate where a user is currently travelling, a current date, a current time, or a weather forecast corresponding to the particular geographic region. Based on the user contextual data, the system may determine that the user is going on a hike, and thus may prefer a terrain view of the geographic area. Accordingly, the system may obtain a set of candidate map tiles available for the geographic area and determine if a terrain view (e.g., a terrain map tile) exists for the geographic area. If a terrain map tile exists, the system may transmit the terrain map tile for display on the user device. In some embodiments, if the terrain map tile does not exist for the geographic area, the system may generate a terrain map tile for the geographic area based on a historic map tile of the geographic area and the preferred type of map tile.

One example embodiment of the techniques of this disclosure is a method for selectively generating map tiles based on user context. The method includes receiving, at one or more processors from a user device, a request for map data for a particular geographic region. The method further includes obtaining a set of user contextual data and a set of candidate map tiles associated with the particular geographic region. The method further includes selecting one or more of the set of candidate map tiles based on the set of user contextual data. Additionally, the method includes transmitting the one or more selected map tiles to the user device for display.

Another example embodiment is a server device for selectively generating map tiles based on user context, where the server device includes one or more processors and a non-transitory computer-readable memory coupled to the one or more processors and storing thereon instructions. The instructions, when executed by the one or more processors, cause the server device to receive from a user device a request for map data for a particular geographic region. The instructions further cause the server device to obtain a set of user contextual data and a set of candidate map tiles associated with the particular geographic region. Moreover, the instructions cause the server device to select one or more of the set of candidate map tiles based on the set of user contextual data, and transmit the one or more selected map tile to the user device for display.

Yet another example embodiment is a non-transitory computer-readable medium storing instructions for selectively generating map tiles based on user context. The instructions, when executed by one or more processors in a computing device, cause the one or more processors to receive from a user device a request for map data for a particular geographic region. The instructions further cause the one or more processors to obtain a set of user contextual data and a set of candidate map tiles associated with the particular geographic region. Additionally, the instructions further cause the one or more processors to select one or more of the set of candidate map tiles based on the set of user contextual data, and transmit the one or more selected map tile to the user device for display.

DETAILED DESCRIPTION

Overview

Figure 1:
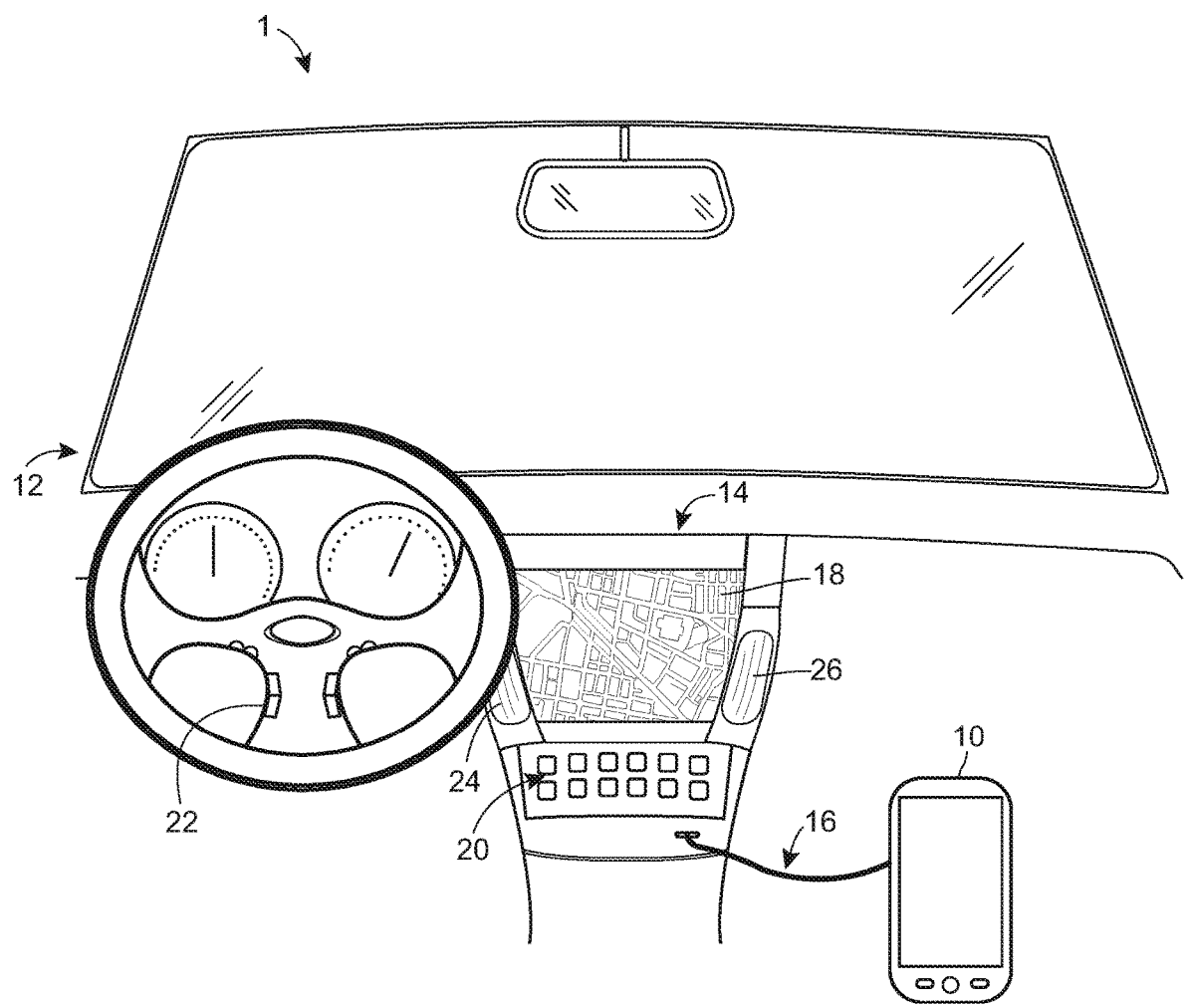
FIG. 1 illustrates an example vehicle in which the techniques of the present disclosure can be used to selectively suggest and/or generate map tiles based on user context.

Generally speaking, the systems and methods of the present disclosure display map data (e.g., a selected map tile) to a user according to a set of user contextual data (also referred to herein as "client contextual data"). The user contextual data may include a current state of the user and/or the user device. For example, the set of user contextual data may indicate that the user is present in a geographic region, and may further indicate how the user moves within the geographic region (e.g., how quickly, in which direction, the mode of transportation for the user, etc.). Thus, the system may selectively display map data to the user based on the user's location and motion in the real world. Correspondingly, as the user moves and/or otherwise causes the set of user contextual data to change, the system may determine and display a corresponding change in the selected map tile.

More specifically, the type of map tile that the user may prefer may be determined based on the set of user contextual data which may include a time-varying property of the geographic region. These time-varying properties may include a daylight level of the geographic region, a time of year (e.g., a distribution of the color of vegetation in the geographic region), or a current or predicted weather condition corresponding to the geographic region (e.g., the presence of rain, fog or snow, and/or of water and/or snow on the ground). Accordingly, the types of map tiles may be selected in response to the set of user contextual data. For example, the types of map tiles may include standard map tiles, terrain map tiles, satellite map tiles, hybrid map tiles, and/or any combination thereof. These map tile types may further depict the geographic region during different seasons or times of year (e.g., winter, autumn, spring, summer, holiday events or celebrations for travel destinations), or during different times of day for the particular geographic region (e.g., rush hour in a city, dawn, midday, evening, dusk, nighttime, etc.). Thus, the system may provide the user with data more accurately representing the current or predicted state of the geographic region. The system may thereby enable the user to perform more accurate and safer navigation of the geographic region. For example, the displayed map tiles may indicate that certain routes in the geographic region are undesirable, such that the user may avoid them when moving through the region.

Alternatively or additionally, the set of user contextual data may be indicative of a current state of the user device (i.e., a property of the user device which varies over time), such as its current battery status or network connectivity (e.g., current available bandwidth for accessing a communications network). In this circumstance, the system may select a map tile in accordance with these parameters. For example, the system may select a low resolution map tile when the battery power and/or the current available bandwidth is low. This can reduce the risk of the battery power depleting, and/or can reduce latency.

Moreover, the system may generate new map tiles in response to determining a type of map tile for display and determining that the type of map tile does not exist for the geographic region. The system may generate the new map tile based on a historic map tile and based on the type of map tile determined from the user contextual data. The system may use the historic map tile (which may be an image captured by a camera) to generate a new map tile, such that the new map tile is a more accurate image of the corresponding portion of the particular geographic region than the historic map tile. For example, the historic map tile may be inconsistent with a current property of the geographic region (e.g., seasonal differences, urban development, etc.). Thus, the new map tile may represent a more accurate image of the corresponding portion of the geographic region because it conforms to the current or predicted property of the geographic region. As a result, the disclosure provides a superior imaging method of a geographical region.

In any event, the new map tile may be included in the set of candidate map tiles, and may be selected for transmission to the user device. However, it will be appreciated that using a generative machine learning model to generate a new map tile of a specific type based on a historic map tile and the type of map tile constitutes an aspect of the disclosure which is independent of the concept of selecting a map tile from a set of candidate map tiles based on a set of user contextual data.

Example Hardware and Software Components

Referring to FIG. 1, an example environment 1 in which the techniques outlined above can be implemented includes a portable device 10 and a vehicle 12 with a head unit 14. The portable device 10 may be a smart phone, a tablet computer, or an in-vehicle navigation system, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fifth-, fourth-, or third-generation cellular network (5G, 4G, or 3G, respectively).

The head unit 14 can include a display 18 for presenting navigation information such as a digital map featuring one or more map tiles. The display 18 in some implementations is a touchscreen and includes a software keyboard for entering text input, which may include the name or address of a destination, point of origin, etc. Similarly, the portable device 10 may also be used to present navigation information or otherwise display a digital map featuring one or more map tiles. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play the audio instructions sent from the portable device 10.

Figure 2:
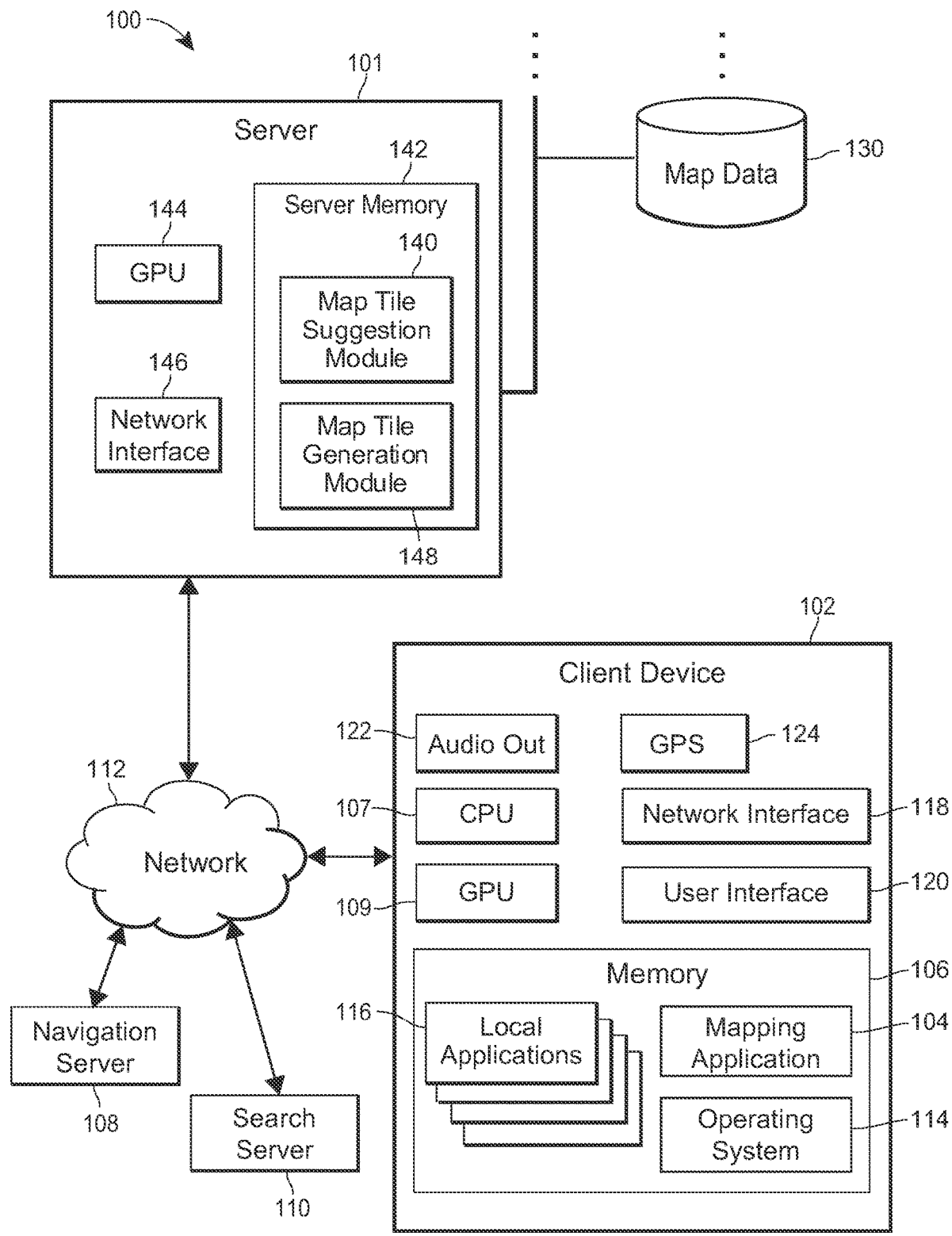
FIG. 2 is a block diagram of an example system in which techniques for selectively suggesting and/or generating map tiles based on user context can be implemented.

Referring to FIG. 2, an example computing environment for a system 100 in which the techniques outlined above can be implemented includes a client device 102, a server 101, a navigation server 108, and a search server 110. The client device 102 can display map data using a mapping application 104, which is stored in the memory 106 as a set of instructions and executes on one or more processor(s) (CPU) 107 and/or a graphics processing unit (GPU) 109. The mapping application 104 in general can display map data including map features supplied by the server 101 via a network 112, which can be a wired or wireless network including any suitable local or wide area network (e.g., the Internet). For example, the mapping application 104 may be a special-purpose application available at an online application store disposed at the server 101 or an application server (e.g., Google+™). A user of the client device 102 may retrieve a copy of the mapping application 104 from the application server and install the retrieved copy of the mapping application on the client device 102. In other implementations, the mapping application 104 can be a software component, such as a plug-in, that operates in a web browser (e.g., Google Chrome® or Apple's Safari®) or another application.

The memory 106 may be a tangible, non-transitory memory and may include any types of suitable memory modules, including random access memory (RAM), read-only memory (ROM), a hard disk drive, flash memory, or other types of memory. In addition to the mapping application 104, the memory stores an operating system (OS) 114 and one or more local application(s) 116 or modules. The operating system 114 may be any type of suitable operating system. The one or more local application(s) 116 may include a variety of installed applications including contacts/address book for a user. The applications 116 and the mapping application 104 can receive digital content via a network interface 118. A user can interact with the applications 104 and 116 via a user interface 120, which can include a touchscreen, a screen along with speakers 122, a keyboard and a mouse, a microphone, a camera, a global positioning system (GPS) sensor 124, a WiFi module, etc.

In general, the client device 102 can be any suitable portable or non-portable computing device. By way of example, the client device 102 may be a smartphone, a tablet computer, a laptop computer, a wearable computing device, etc., such as the portable device 10 of FIG. 1. In various implementations, the client device 102 can include fewer components than illustrated in FIG. 2 or conversely, additional components. In some implementations, for example, the client device 102 may include multiple instances of the CPU 107. For clarity, the client device 102 may be operated by a user who views map data.

The server 101 from which the client device 102 receives map data may be communicatively coupled to one or several databases such as a map database 130 (also referenced herein as "map data" and "map tile database") storing map data that may include one or more historic map tiles for a geographic area. These one or more historical map tiles may include street and road information, topographic data, satellite imagery, information related to public transport routes, information about businesses or other points of interest (POIs). Moreover, the map database 130 may include information about current traffic conditions, information about non-spatial attributes associated with the map data such as weather data, demographic data, and/or energy consumption data for corresponding geographic areas, cost of real-estate properties, department store prices, etc., and a navigation database storing navigation data that can include directions from a source to a destination for various modes of transportation (walking, bicycling, driving, public transportation, etc.). The map data can be stored in the map database 130 in a vector graphics format, a raster format, or both. In general, the server 101 can receive information about geographically related objects from any number of suitable databases, web services, etc. In addition to communicating with the server 101, the client device 102 can communicate with any suitable number of servers via the communication network 112 such as a navigation server 108, a search server 110, a traffic server (not shown), a weather data server (not shown), etc.

It will be understood that although the server is illustrated in FIG. 2 as a single device, in general the server 101 can correspond to multiple servers responsible for respective types of content or respective operations. For example, the server 101 can include a server that stores map features corresponding to a first portion of the Earth and another server that stores map features corresponding to a second portion of the Earth.

In the illustrated implementation, the system for suggesting and/or generating map tiles based on user context includes a map tile suggestion module 140 stored in a server memory 142 and executed by the server CPU 144. The map tile suggestion module 140 may receive a request from the client device 102 corresponding to a geographic region, and in response, may obtain a set of user contextual data through communication with the client device 102. The map tile suggestion module 140 may also obtain a set of candidate map tiles representing the requested geographic region from the map data 130 and select one or more of the candidate map tiles based on the user contextual data. It is to be understood that for any requested geographic region, the map data 130 may include multiple map tiles and map tile types representing the requested geographic region. Thus, the set of candidate map tiles for any requested geographic region may include one or more satellite map tiles, one or more terrain map tiles, one or more standard map tiles, one or more hybrid map tiles, one or more seasonal map tiles (e.g., winter map tiles, summer map tiles, autumn map tiles, spring map tiles), one or more time of day map tiles (e.g., dawn map tiles, midday map tiles, evening map tiles, dusk map tiles, nighttime map tiles, etc.), any other suitable map tiles, and/or any combinations thereof.

For example, a user may request a map of San Francisco. The map tile suggestion module 140 may receive the request and obtain the set of user contextual data through communication with the client device 102. The set of user contextual data may indicate that the user placed the request in the afternoon of a Summer day, and that the last map tile the user viewed/requested was a satellite map tile. Using this set of user contextual data, the map tile suggestion module 140 may obtain a set of candidate map tiles from the map data 130. The set of candidate map tiles may include a set of historical map tiles associated with the city of San Francisco.

These historical map tiles may feature the city in various conditions (e.g., seasonal changes, weather conditions (e.g., rain, snow, etc.), times of day), such that the map tile suggestion module 140 may select a historic map tile that best correlates to the set of user contextual data. Thus, the map tile suggestion module 140 may search the set of candidate map tiles to select a satellite map tile of San Francisco in Summer afternoon conditions. However, if the map tile suggestion module 140 is unable to find a historic map tile of San Francisco meeting these conditions, the module 140 may determine that another map tile of the historic map tiles sufficiently corresponds to the set of user contextual data, such that the module 140 will select the map tile for transmission and display to the user. This technique is described in more detail below.

Also stored in the server memory 142 and executed by the server CPU 144 is a map tile generation module 148. The map tile generation module 148 may generate a new map tile if, in response to a user request for map data of a geographical region, the map data 130 does not include a map tile that sufficiently corresponds with the set of user contextual data. For example, a user may request map data corresponding to a remote location, or a location that simply does not have updated, relevant map tiles. Accordingly, the map tile generation module 148 may obtain an historic map tile corresponding to the geographical region from the map data 130, and generate a new map tile based on the historic map tile and the set of user contextual data. The new map tile may correspond to the set of user contextual data, such that the map tile type for the new map tile may be preferred by the user as determined based on the context. The map tile generation module 148 may then transmit the new map tile to the client device 102 for display to the user. This technique is also described in more detail below.

In some embodiments, the map database 130 may store map tiles within a tree data structure that spatially organizes the map tiles. The tree data structure may include a set of nodes containing map tiles corresponding to geographic regions at various levels of detail. The set of nodes may be organized into an ancestor/descendant hierarchy where each ancestor node includes one or more descendant nodes. Each descendant node may contain map tiles representing a portion of the geographic region represented by the map tiles contained in the ancestor node, such that the descendant node map titles include a higher level of detail than the ancestor node map tiles.

When a mapping application or service (e.g., mapping application 104) receives a request to display a geographic region, the application may access the tree data structure to locate the ancestor node corresponding to the requested geographic region. The application may then retrieve the map tiles contained in the ancestor node and display one or more of the map tiles. However, in embodiments, the application may access the one or more descendant nodes to obtain at least one map tile representing each portion of the requested geographic region at a higher level of detail than the ancestor node map tiles. The application may then combine these descendant node map tiles to create a finer resolution representation of the requested geographic region.

For example, if a user requests map data representing the state of Kansas, the mapping application may search the tree data structure for a node corresponding to Kansas. The application may then access the descendant nodes from the node corresponding to Kansas to retrieve descendant node map tiles for each portion of the state (e.g., a Northwest Kansas map tile, a Northeast Kansas map tile, a Southwest Kansas map tile, and a Southeast Kansas map tile). Finally, the application may combine each descendant node map tile into a composite representation of the state of Kansas for display to the user.

Figure 3:
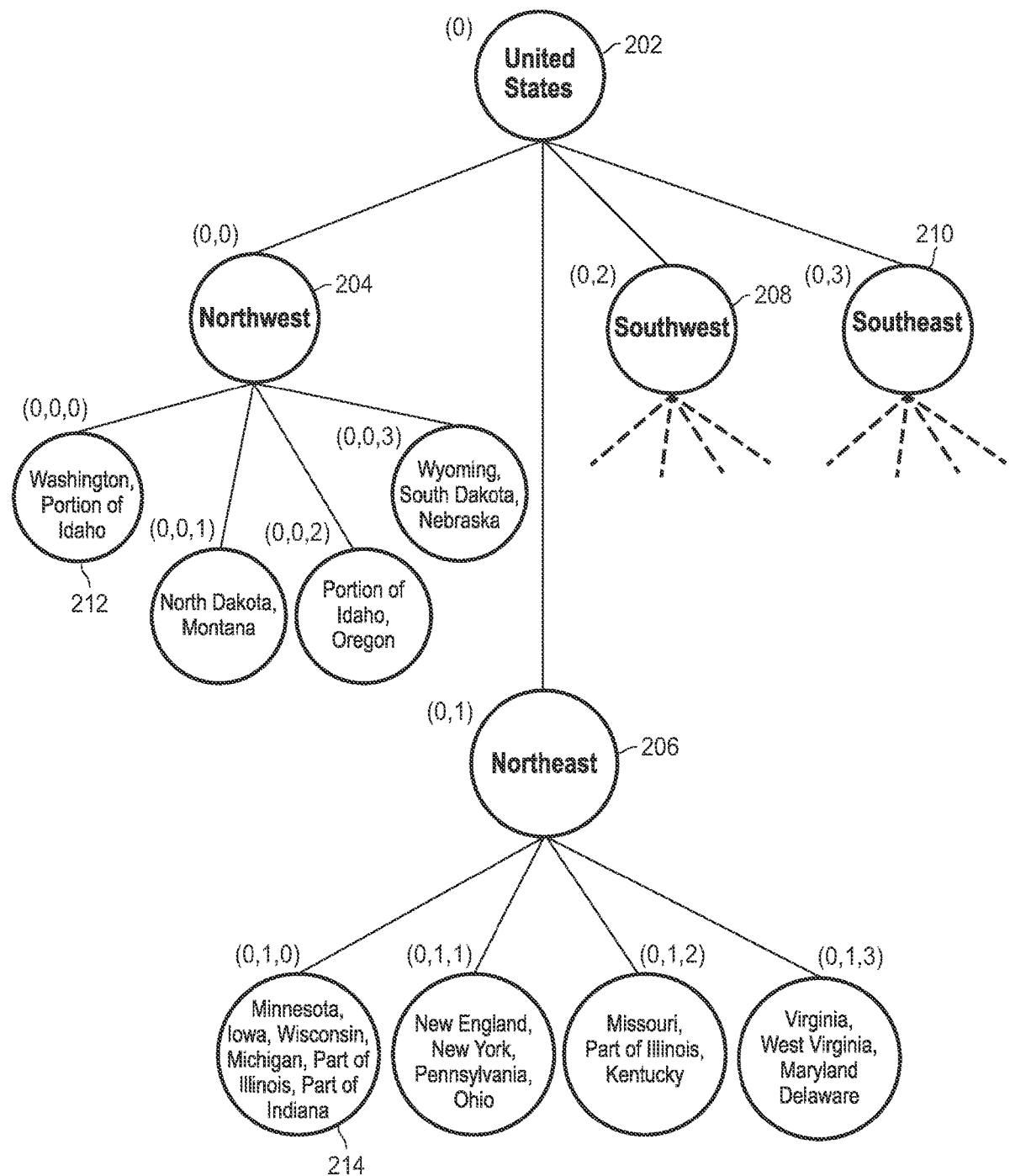
FIG. 3 illustrates an example tree data structure where each node represents a portion of a geographic area.

To illustrate, and in reference to FIG. 3, an example tree data structure 200 (which may be stored at the server 101) spatially organizes map data, for example from the map database 130 of FIG. 2, such that descendant nodes of the tree data structure correspond to a portion of a geographic area at a higher level of detail as their respective ancestor nodes. For example, ancestor node 202 of the tree data structure 200 represents the continental United States. Ancestor node 202 has four children nodes which represent the northwest 204, northeast 206, southwest 208, and southeast 210 quadrants of the United States, respectively. Each of the children nodes has four children nodes which each represent some combination of states or portions of states within the United States. For example, the northwest node 204, has a northwest child node 212 which represents Washington state and a portion of Idaho, and the northeast node 206 has a northwest child node 214 which represents Minnesota, Iowa, Wisconsin, Michigan, a portion of Illinois, and a portion of Indiana.

Each node of the tree data structure may include one or more map tiles which display the geographic area that the node represents, and may correspond to a level of detail. For example, a node which represents the entire United States may include one or more map tiles at a lower magnification than a descendant node which represents a single state. Moreover, each node may correspond to a different number of map tiles available to represent the geographic area. The United States node 202 may correspond to a relatively large number of map tiles featuring the United States in all seasonal states (e.g., Spring, Summer, Fall, Winter), weather conditions (e.g., rain, snow, etc.), times of day, etc. By contrast, the descendant node 212 may correspond to a relatively smaller number of map tiles featuring Washington and a portion of Idaho in only one seasonal state, one weather condition, and at one time of day.

For each map tile included in the nodes of the example tree data structure 200, there may be one or several map features which represent geographic entities. For example, a map feature may be a state, a city, a street, a road, a highway, a town, a public transportation hub, a body of water, a shopping center, a department store, a neighborhood, a building, a home, a restaurant, etc., or some combination thereof. Each map feature may be made up of one or several map feature fragments where the map feature fragments may be combined to represent the map feature. Thus, as a mapping application or service accesses descendant nodes further down the example tree data structure 200, the map tiles contained therein may include more map features as the magnification of the geographic region increases. For example, a map feature which represents the borders of Colorado may be made up of a first map feature fragment which represents the northern, eastern, and western borders of Colorado and a second map feature fragment which represents the southern border of Colorado.

Furthermore, each node of tree data structure may be identified by a cell identification (ID), which in some embodiments may be an s2 cell ID along a Hilbert curve. In other embodiments, the nodes of the tree data structure may be identified in any other suitable manner. In the example tree data structure 200, the cell ID for the United States node 202 may be (0), the cell ID for the northwest node 204 may be (0,0), the cell ID for the northeast node 206 may be (0,1), the cell ID for the southwest node 208 may be (0,2), and the cell ID for the southeast node 210 may be (0,3). For each respective descendant node, a first portion of the descendant node's cell ID may be the same as the cell ID for the parent of the descendant node, and a second portion of the cell ID may be based on the location of the descendant node with respect to the parent. For example, the descendant node 212 which represents Washington state and a portion of Idaho has cell ID (0,0,0) which includes a first portion (0,0) that is the same as the cell ID for northwest node 204, followed by a second portion (0) indicating that the descendant node 212 represents the northwest quadrant of the northwest node 204. This is merely one example in which the nodes of the tree data structure 200 may be identified, and in other embodiments the nodes may be identified in any other suitable manner.

While the example tree data structure 200 includes nodes at three levels of detail, this is merely for ease of illustration only. The tree data structure 200 may include nodes at 10 levels of detail, at 20 levels of detail, or any other suitable number of levels of detail. Moreover, while the example tree data structure 200 is illustrated as a quadtree (a data structure in which a node has at most four children), the tree data structure may be a binary tree, an octree (a data structure in which a node has at most eight children), a k-d tree or any other suitable tree data structure which spatially organizes map data.

Example Historic Map Tiles for Generating and Suggesting Map Tiles

In any event, a server, client device, or other computing device capable of generating or suggesting map tiles may access such an example tree data structure 200 in response to receiving a request for map data corresponding to a geographic region. This request for map data may include a map tile type. As previously mentioned, the map tile type refers to the visual characteristics, informational layout, and overall aesthetic qualities of the map tile displayed to a user. Thus, the map tiles contained in any of the nodes of the example tree data structure 200 may represent one or more map tile types.

Figure 4A:
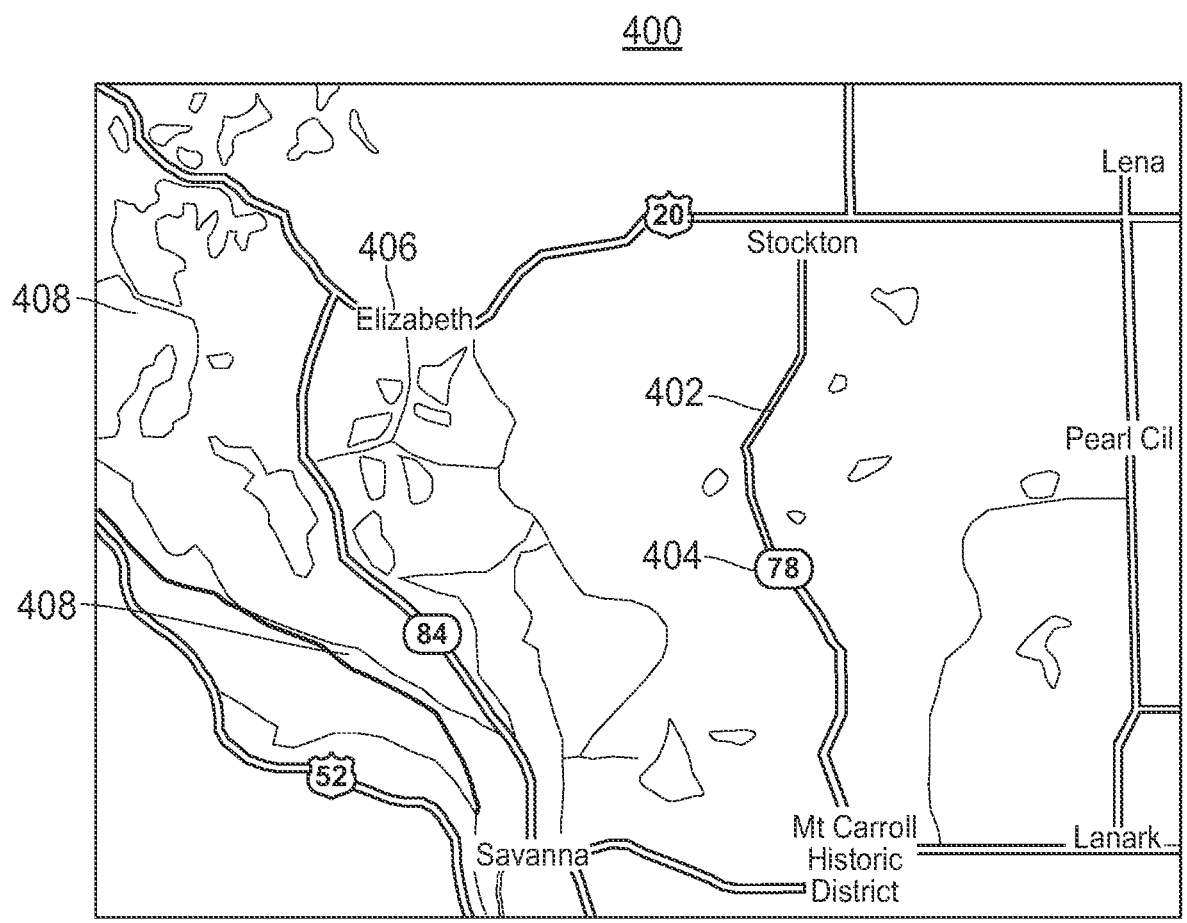
FIG. 4A is an example standard map tile that may be presented to a user in accordance with techniques for selectively suggesting and/or generating map tiles based on user context.

As an example, a map tile type may include a standard map tile 400, as shown in FIG. 4A. The standard map tile 400 may include a rendering of various features in a two-dimensional plane using a Mercator projection, such as roadway indications 402, roadway names 404, location names 406, geographical feature indications 408, and/or any other suitable features or combinations thereof. The geographical feature indications 408 may include, for example, forest preserves, national monuments, rivers, lakes, streams, oceans, and/or any other geographic feature of the particular geographic region. The standard map tile 400 may include color, cross hatching, or other patterns to indicate any of the features included in the tile 400. For example, and as illustrated in FIG. 4A, the roadway indications 402 and geographical feature indications 408 (e.g., forest/park, river) may be different colors from the background representing the land of the geographical region.

Figure 4B:
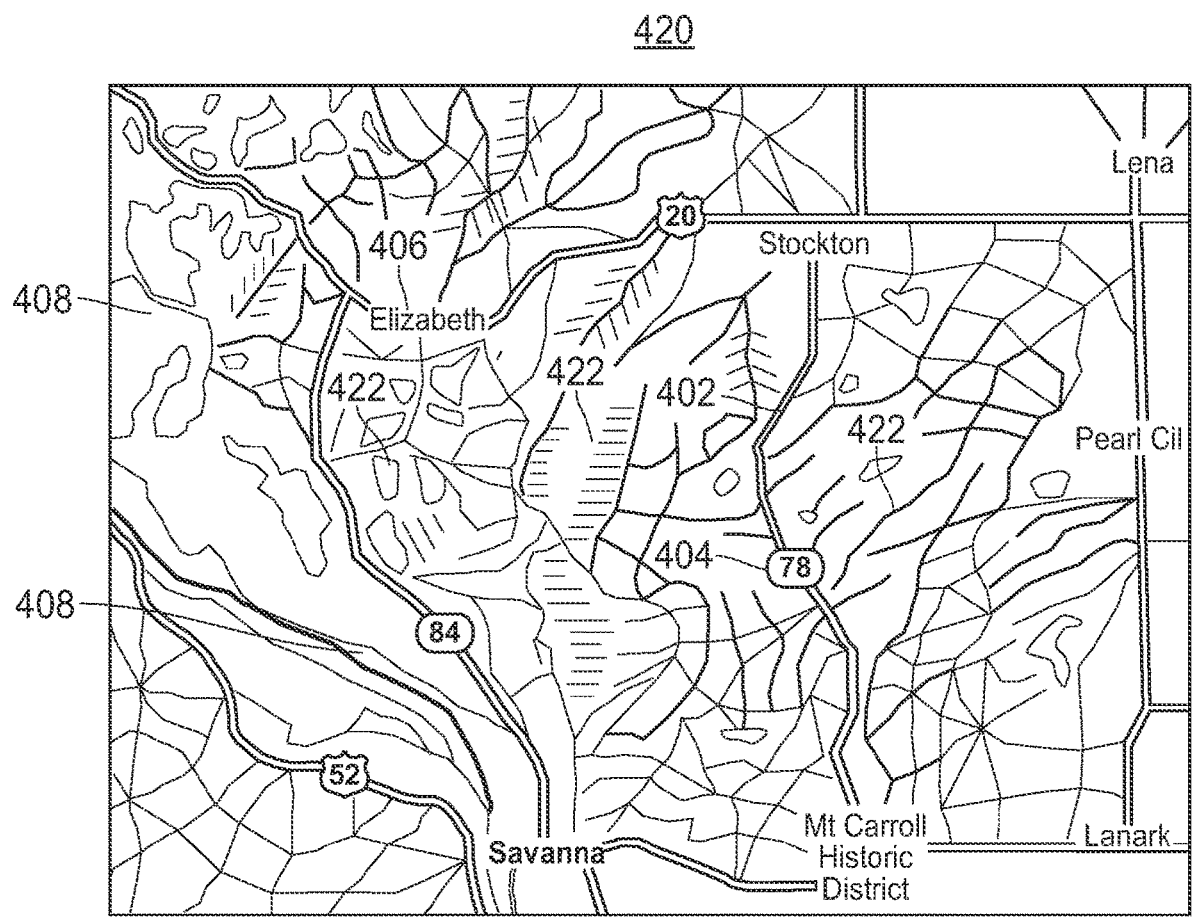
FIG. 4B is an example terrain map tile that may be presented to a user in accordance with techniques for selectively suggesting and/or generating map tiles based on user context.

Another map tile type may be a terrain map tile 420 as shown in FIG. 4B. The terrain map tile 420 may include similar features to the standard map tile 400 (e.g., roadway indications 402, roadway names 404, location names 406, geographical feature indications 408). The terrain map tile 420 may also include terrain indications 422, representing, for example, topographical changes in elevation within the geographic region. These terrain indications 422 may be represented as part of, or independently of each of the other indications provided in the terrain map tile 420. To illustrate, a terrain indication 422 may be included as part of an indication 408 of, for example, a forest or park preserve. The terrain map tile 420 may include color, cross hatching, or other patterns to indicate any of the features included in the tile 420. For example, and as illustrated in FIG. 4B, the roadway indications 402 and geographical feature indications 408 (e.g., forest/park, river) may be different colors from the background representing the land of the geographical region. Moreover, the terrain indications 422 may be indicated using any suitable method, such as a color-coded elevation representation (e.g., a topographical "relief map" or "heatmap").

Figure 4C:
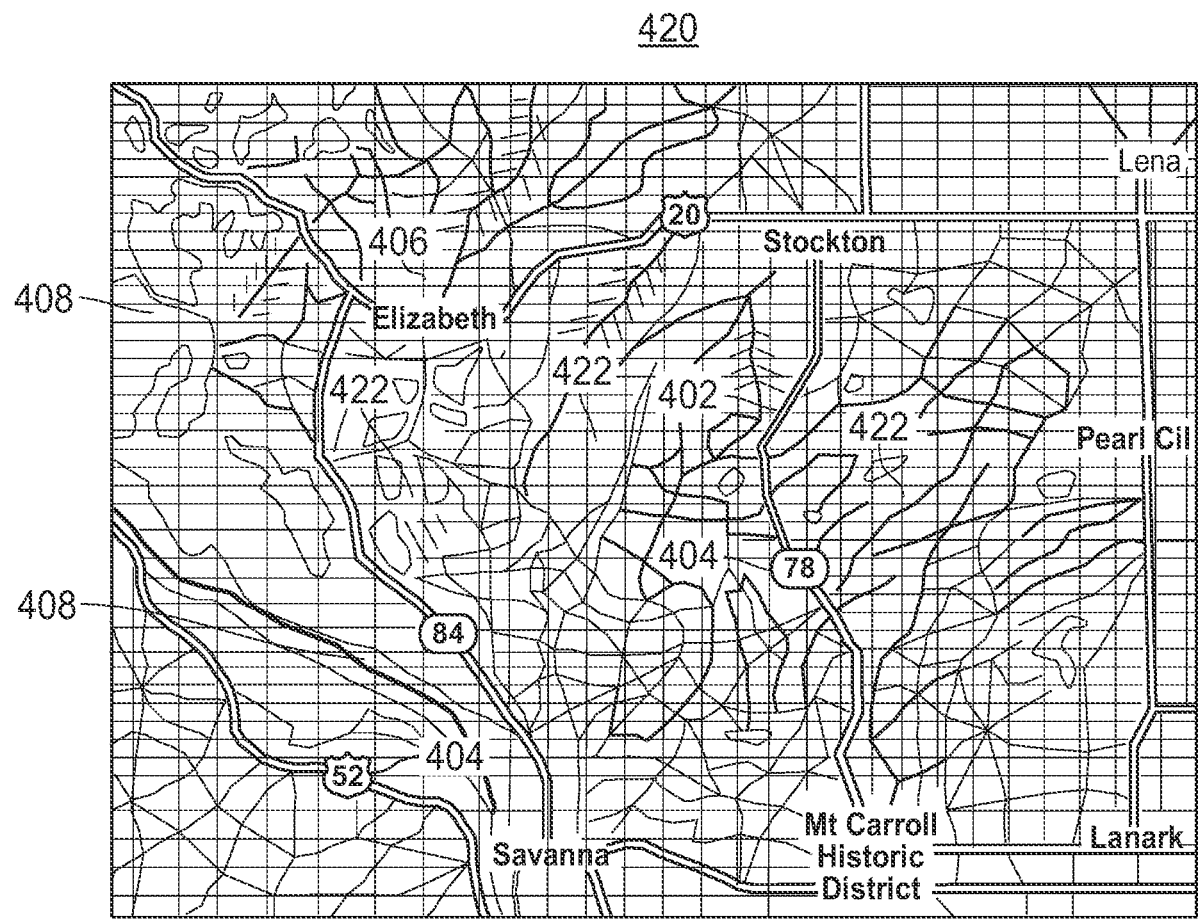
FIG. 4C is an example satellite map tile that may be presented to a user in accordance with techniques for selectively suggesting and/or generating map tiles based on user context.

Turning to FIG. 4C, yet another map tile type may include a satellite map tile 440. The satellite map tile 440 may represent a photorealistic representation of the geographical region from an aerial view. For example, the satellite map tile 440 may represent the geographical region as captured by a camera or other image capture device from an overhead perspective (e.g., "satellite" perspective) of the geographical region. Thus, the satellite map tile 440 may include similar features to the standard map tile 400 (e.g., roadway indications 402, roadway names 404, location names 406, geographical feature indications 408) and the terrain map tile 420 (e.g., terrain indications 422). However, the similar features represented in the satellite map tile 440 may appear different because the tile 440 provides a realistic view of the features, as opposed to the generated features in the standard map tile 400 and the terrain map tile 420. Nonetheless, the satellite map tile 440 may include color, cross hatching, or other patterns to indicate any of the features included in the tile 440.

Thus, FIGS. 4A-4C provide three examples of map tiles and map tile types. It is to be appreciated that the three identified map types (e.g., "standard," "terrain," and "satellite") comprise a non-exhaustive list of potential map types. For example, another map tile type may include aspects of two or more map tile types. Such a map tile may represent a "hybrid" tile type.

In any event, the map tiles represented in FIGS. 4A-4C may be stored in a database (e.g., map data 130) as representative of one or more map tile types for a particular geographic region. Thus, when the server, client device, etc. receives a request for map data corresponding to the particular geographic region represented by the map tiles (400, 420, 440), the relevant device may obtain one or more of these map tiles from the database. The device may then determine which map tile type should be selected for display based on the request (e.g., a set of user contextual data). This technique is also described in more detail below.

Example Logic for Suggesting Map Tiles

Determining a map tile type and a corresponding map tile for suggestion to a user may be performed using a set of rules corresponding to the set of user contextual data. The set of user contextual data may include one or more contextual parameters that the server device 142 may use to determine a user's preferred map tile type. The server device 142 may retrieve the set of user contextual data from applications installed on the client device (e.g., calendar application), data stored on a server, and/or any other suitable location.

For example, the server device 142 may retrieve a set of user contextual data including contextual parameters indicating that (1) the user intends to hike on September $10^{th}$, (2) the hiking location, and that (3) the current date is September $10^{th}$. The set of user contextual data may also include contextual parameters indicating that (4) the weather forecast corresponding to the hiking location predicts thunderstorms on September $10^{th}$, and that (5) the user is currently following a route on a navigation application featuring an end destination that differs from the hiking location.

Continuing this example, the server device 142 may analyze each contextual parameter to determine a preferred map tile type. In embodiments, the server device 142 may associate each contextual parameter with a known map tile type, count the number of contextual parameters associated with each known map tile type, and suggest the map tile type with the highest number. To illustrate, the server device 142 may associate contextual parameters (1), (2), and (3) with a terrain map tile type because the user may prefer to view the topographical features of the geographic location prior to hiking. The server device 142 may also associate contextual parameters (4) and (5) with a standard map tile type because the user may no longer intend to hike, and may not prefer to see the topographical features of the end destination indicated in the route. Accordingly, the server device 142 may suggest the terrain map tile type because three contextual parameters are associated with the terrain map tile type, whereas two parameters are associated with the standard map tile type.

Moreover, the server device 142 may apply weighting factors to the count to potentially achieve a more accurate representation of the implications of particular contextual parameters. Referencing the above example, the server device 142 may apply weighting factors to contextual parameters (1), (2), and (3), in light of contextual parameters (4) and (5), to decrease their impact on the resulting map tile type suggestion. The server device 142 may associate an adverse weather condition forecast (e.g., contextual parameter (4)) corresponding to an intended outdoor activity (e.g., contextual parameters (1) and (2)) with a decreased chance of performing the intended outdoor activity. Further, the server device 132 may associate an intended destination (e.g., contextual parameter (5)) that differs from the location of the intended activity (e.g., contextual parameter (2)) on the date of the intended activity (e.g., contextual parameters (1) and (3)) with a decreased chance of performing the intended activity.

Consequently, the server device 142 may apply a weighting factor to all or some of contextual parameters (1), (2), and (3) to decrease their impact on the resulting map tile type suggestion, and may apply a weighting factor to one or both of contextual parameters (4) and (5) to increase their impact on the resulting map tile type suggestion. The server device 142 may then add the weighted count from all contextual parameters and may determine that the standard map tile type has a larger weighted count than the terrain map tile type. Thus, the server device 142 may suggest the standard map tile type.

Additionally or alternatively, the server device 142 may calculate a confidence score for each contextual parameter to each known map tile type, take the average of all confidence scores for each known map tile type, and suggest the known map tile type with the largest average score. For example, the server device 142 may strongly associate contextual parameter (1) with a terrain map tile type, and may weakly associate contextual parameter (1) with all other map tile types. The server device 142 may then generate a high confidence score (e.g., a 95 out of 100) for the terrain map tile type, and lower confidence scores (e.g., a 30 out of 100, etc.) for each other map tile type for contextual parameter (1). Such scores may be predetermined, or the server device 142 may calculate the confidence scores based on an algorithm utilizing data association, semantic analysis, and/or any other suitable technique. However, it should be understood that the server device 142 may analyze the contextual parameters in accordance with any suitable algorithm or technique.

Figure 5:
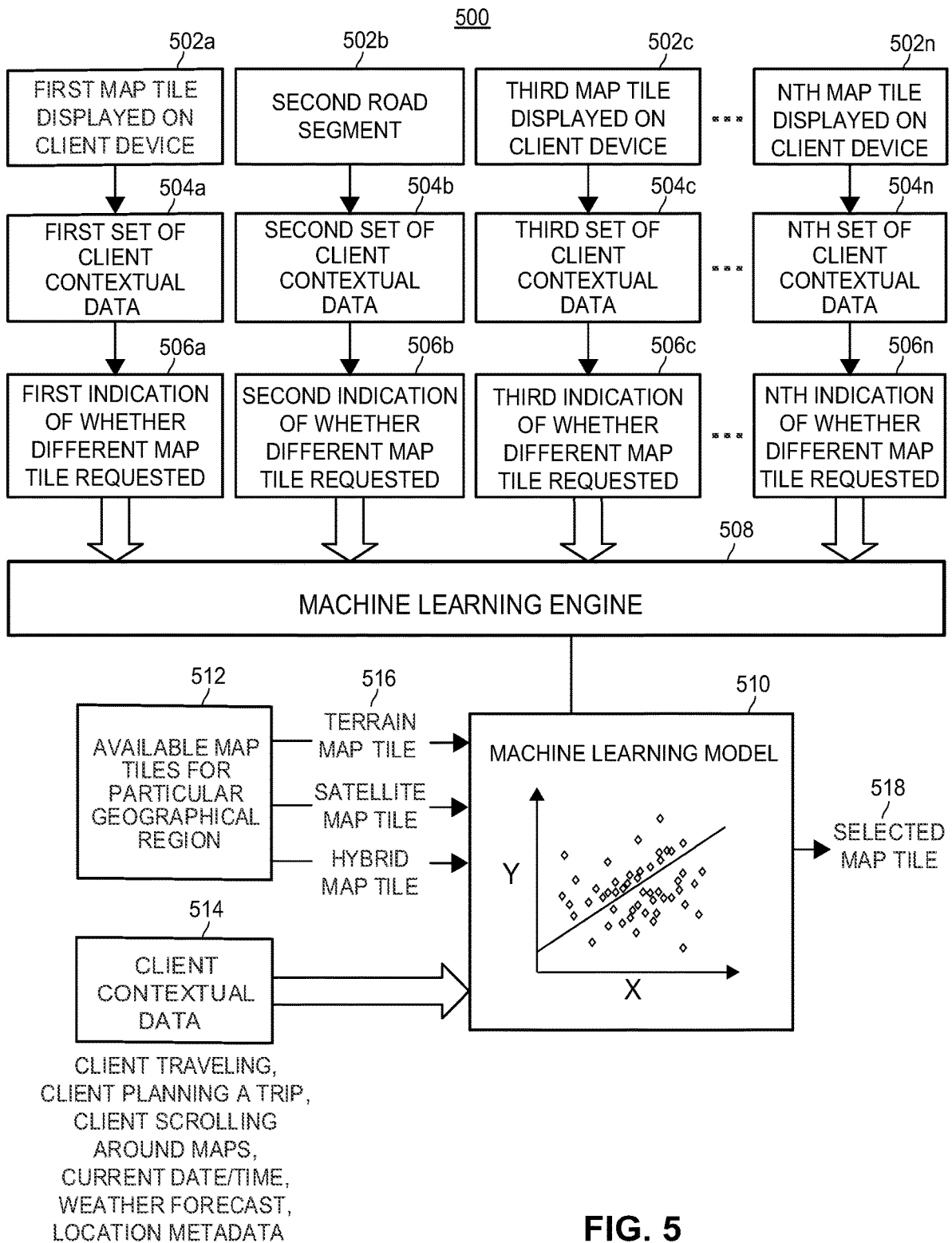
FIG. 5 is a combined block and logic diagram that illustrates the selective suggestion of map tiles based on user context using a machine learning model.

For example, FIG. 5 schematically illustrates how a server device 142 (e.g., the map tile suggestion module 140 of FIG. 2) may determine a suggested map tile for each request for map data in an example scenario. Some of the blocks in FIG. 5 represent data structures or memory storing these data structures, registers, or state variables (e.g., blocks 502a-502n, 504a-504n, 506a-506n, 510, 512, 514), other blocks represent hardware and/or software components (e.g., block 508), and other blocks represent output data (e.g., block 518). Input signals are represented by arrows labeled with corresponding signal names.

In some embodiments, the server device 142 includes a machine learning engine 508 to generate the machine learning model 510. The machine learning model 510 may be generated using various machine learning techniques such as a regression analysis (e.g., a logistic regression, linear regression, or polynomial regression), k-nearest neighbors, decisions trees, random forests, boosting (e.g., extreme gradient boosting), neural networks, support vector machines, deep learning, reinforcement learning, Bayesian networks, etc. To generate the machine learning model 510, the machine learning engine 508 receives training data including a first map tile displayed on a client device 502a previously provided to a user along with a first set of client contextual data 504a when the first map tile 502a was provided, and a first indication of whether the user requested a different map tile 506a. The training data also includes a second map tile displayed on a client device 502b previously provided to a user along with a second set of client contextual data 504b when the second map tile 502b was provided, and a second indication of whether the user requested a different map tile 506b. Furthermore, the training data includes a third map tile displayed on a client device 502c previously provided to a user along with a third set of client contextual data 504c when the third map tile 502c was provided, and a third indication of whether the user requested a different map tile 506c. Still further, the training data includes an nth map tile displayed on a client device 502n previously provided to a user along with an nth set of client contextual data 504n when the nth map tile 502n was provided, and an nth indication of whether the user requested a different map tile 506n.

While the example training data includes four map tiles 502a-502n provided to the same or different users, this is merely an example for ease of illustration only. The training data may include any number of map tiles (and corresponding contextual data and indications of whether the user requested a different map tile) from any number of users.

The machine learning engine 508 then analyzes the training data to generate a machine learning model 510 for identifying map tiles for any particular set of client contextual data. In some embodiments, the machine learning engine 508 generates a separate machine learning model for each client contextual parameter. As previously mentioned, client contextual data may comprise information such as geographic location, travel status (e.g., currently moving/not moving), travel destination, time of day, seasonal information, weather forecasts, etc. In any particular request for map data, any number of these types of client contextual data may or may not be available (e.g., due to low network connectivity, minimal bandwidth, etc.), such that the machine learning model may need to determine a map tile for display based on any the client contextual data. Thus, the machine learning engine 508 may generate a first machine learning model to, for example, determine a map tile based on the client travel destination, a second machine learning model for determining a map tile based on the current season (winter, summer, etc.), and a third machine learning model for determining a map tile based on a weather forecast for the client travel destination. While the machine learning model 510 is illustrated as a linear regression model, the machine learning model may be another type of regression model such as a logistic regression model, a decision tree, neural network, hyperplane, or any other suitable machine learning model.

For example, when the machine learning technique is random forests or boosting, the machine learning engine 508 may collect several representative samples of subsets of the training data. Using each representative sample, the machine learning engine 508 may generate a decision tree for identifying map tiles. The machine learning engine 508 may then aggregate and/or combine each of the decision trees to generate the machine learning model 510, by for example taking a majority vote of the map tile types determined at each individual tree, ranking the map tile types according to confidence scores assigned to the map tile types at each individual tree and selecting the highest ranked map tile type, etc.

Each decision tree may include several nodes, branches, and leaves, where each node of the decision tree represents a test on a client contextual parameter (e.g., is the battery power above 20 percent?). Each branch represents the outcome of the test (e.g., the battery power is below 20 percent). Moreover, each leaf represents a different map tile type (e.g., a standard map tile type), or confidence score for one or more map tile types (e.g., a confidence score of 75 for the standard map tile type and a confidence score of 25 for a winter, terrain map tile type) based on the combined test outcomes for the branches which connect to the leaf.

For example, the machine learning engine 508 may generate a decision tree where a first node corresponds to whether the current user activity is an outdoor activity. If the current user activity is not an outdoor activity, a first branch may connect to a first leaf node which may indicate that the map tile type is a standard map tile type. If the current user activity is an outdoor activity, a second branch may connect to a second node which corresponds to the current time of year.

If the current time of year is winter, a third branch may connect to a second leaf node which may indicate that the map tile type is a winter, terrain map tile type. However, if the current time of year is summer, a fourth branch may connect to a third leaf node which may indicate that the map tile type is a summer, terrain map tile type. While the decision tree includes three leaf nodes and four branches, this is merely an example for ease of illustration only. Each decision tree may include any number of nodes, branches, and leaves, having any suitable number and/or types of tests on client contextual parameters and/or statistical measures.

Moreover, while generating a selected map tile 518 is described within the context of a machine learning environment, it is to be appreciated that generating the selected map tile 518 may occur without a machine learning process. For example, the map tile suggestion module 140 of FIG. 2 may determine a suggested map tile (e.g., selected map tile 518) based on a relational database, weighting logic, and/or any other suitable algorithmic architecture.

In any event, in response to a request for map data by a user, the system of FIG. 5 receives a set of map tiles for a particular geographical region 512 from the map database 130, for example. In this example, the set of map tiles for a particular geographical region 512 includes map tile types 516 (e.g., "terrain," "satellite," and "hybrid"), but in general the set of map tiles for a particular geographical region 512 can contain any number of map tiles and map tile types. For each map tile and map tile type, the system receives contextual data 514 indicative of current and planned environments related to the user. The contextual data 514 may include travel data indicating an upcoming or otherwise planned trip for the user; scrolling data representative of the user's usage of a mapping application or service; current date data such as the time of day, day of the week, current month, etc.; weather data for the area surrounding the user's location in the mapping application or service; forecast data for the area surrounding the user's location in the mapping application or service; location data indicative of the user's location in the mapping application or service, etc.

The machine learning engine 508 may then apply the map tiles 516 and the client contextual data 514 to the machine learning model 510 to identify a selected map tile 518. In other embodiments, the machine learning engine 508 applies the map tiles 516 and the client contextual data 514 to the first machine learning model to determine a map tile based on the client travel destination, the second machine learning model to determine a map tile based on the current season, and the third machine learning model to determine a map tile based on a weather forecast for the client travel destination. For example, for a first set of client contextual data 514, the machine learning model 510 determines the terrain map tile 516 should be selected and displayed to a user as the selected map tile 518. For a second set of client contextual data 514, the machine learning model 510 determines the satellite map tile 516 should be selected and displayed to a user. For a third set of client contextual data 514, the machine learning model 510 determines the hybrid map tile 516 should be selected and displayed to a user.

Example Logic for Generating Map Tiles Using Machine Learning Techniques

In certain circumstances, the machine learning model 510 may suggest a map tile type that does not exist (or is outdated) in the available map tiles for the particular geographical region 512. For example, the model 510 may determine that a satellite map tile 516 should be selected and displayed to a user. However, the map tile suggestion module 140 of FIG. 2 may access the available map tiles for the particular geographical region 512 and determine that no satellite map tile exists for the region. Accordingly, the map tile generation module 148 of FIG. 2 may generate a satellite map tile representing the region for display to a user.

Figure 6A:
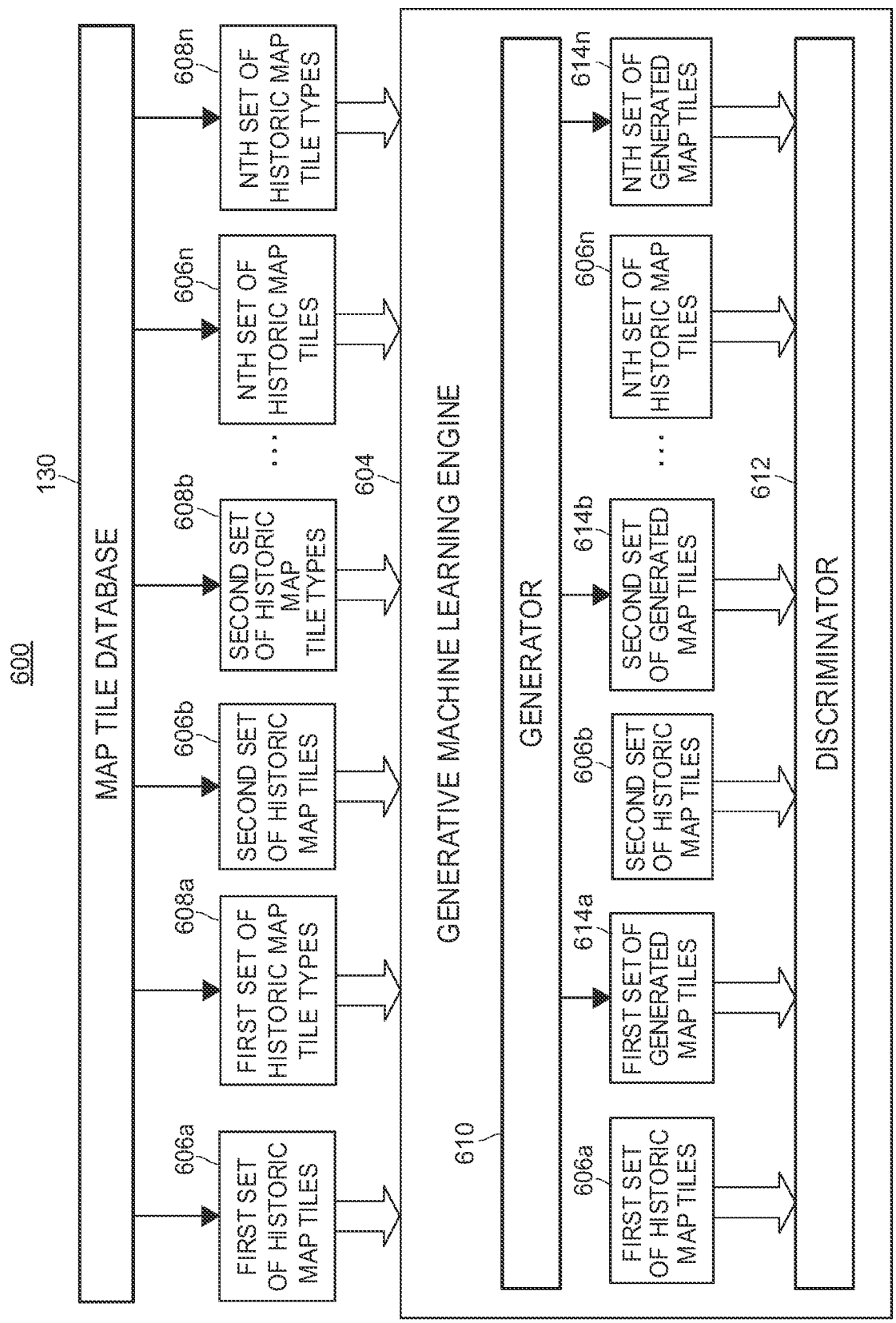
FIG. 6A is a combined block and logic diagram that illustrates the training process for a generative machine learning model configured to generate new map tiles based on user context.

FIG. 6A schematically illustrates how the map tile generation module 148 of FIG. 2 may be trained to generate a map tile for each request for map data in an example scenario. Some of the blocks in FIG. 6A represent data structures or memory storing these data structures, registers, or state variables (e.g., blocks 602, 606a-606n, 608a-608n), other blocks represent hardware and/or software components (e.g., block 604, 610, 612), and other blocks represent output data (e.g., blocks 614a-614n). Input signals are represented by arrows labeled with corresponding signal names.

Generally speaking, and as mentioned above, a database responsible for storing map tiles representing the entire world down to a high level of granularity (e.g., map database 130) may comprise a large number of map tiles. Updating such a database may take a long time, such that the map tiles representing a particular geographic region may not be frequently updated. A particular geographic region may also have map tiles representing the region that are updated at different rates, such that any given map tile representing any particular geographic region may be updated very infrequently, or not at all. Moreover, a particular geographic region may not have a map tile of each map tile type (e.g., "standard," "satellite," "terrain," "hybrid," etc.) representing the particular geographic region.

Consequently, when a user requests map tile data associated with a particular geographic region, the map tile suggestion module 140 of FIG. 2 may receive client contextual data to determine a map tile type for display. The module 140 may further check the received map data 130, and determine that no map tile of the map tile type determined exists in the map data 130 for the particular geographic region. In response, the map tile generation module 148 may generate a new map tile representative of the particular geographic region.

The generative machine learning engine 604 may generate a new map tile based on a generative machine learning model approach. Broadly defined, a generative machine learning model approach involves training a generative engine to learn the regularities and/or patterns in a set of input data, such that the engine may generate new examples of the input data. As the generative engine is trained on more input data, the engine's generated new examples may increase in similarity to the input data. Thus, a goal of a generative machine learning model approach is to enable the generation of new examples of the input data that are similar to the original input data.

The map tile generation module 148 of FIG. 2 may include a generative machine learning engine 604 to generate map tiles for display to a user. To generate the map tiles, the generative machine learning engine 604 receives training data including a first set of historic map tiles for a particular geographic region 606a along with a first set of historic map tile types 608a corresponding to the first set of historic map tiles 606a. The training data also includes a second set of historic map tiles for a particular geographic region 606b along with a second set of historic map tile types 608b corresponding to the second set of historic map tiles 606b. Furthermore, the training data includes an nth set of historic map tiles for a particular geographic region 606n along with an nth set of historic map tile types 608n corresponding to the nth set of historic map tiles 606n.

The sets of historic map tiles 606a-606n may be stored in the map tile database 130, and may represent each available map tile for a particular geographic region. For example, a particular geographic region may have a "standard" map tile representing the region that was last updated two years ago. Similarly, the particular geographic region may have a "satellite" map tile representing the region that was last updated one year ago. Moreover, the particular geographic region may have a "terrain" map tile that was updated two days ago. Thus, the first set of historic map tiles 606a may include each of these map tiles. Accordingly, the first set of historic map tile types 608a may include data indicating that the map tile types included in the first set of historic map tiles 606a comprises "standard," "satellite," and "terrain."

Each of the sets of historic map tiles 606a-606n may include similar map tiles, and each set of historic map tile types 608a-608n may include similar map tile types. However, it is to be appreciated that each set of the sets of historic map tiles 606a-606n may include different map tiles, such that each set is representative of a different geographic region. It is to be similarly appreciated that each set of historic map tile types 608a-608n may include any combination of map tile types, corresponding to the types of map tiles representing the geographic region indicated in the respective set of historic map tiles 606a-606n.

In any event, the generative machine learning engine 604 may retrieve the sets of historic map tiles 606a-606n and the sets of historic map tile types 608a-608n from the map tile database 130. Upon retrieval, the generative machine learning engine 604 may utilize the data to train the generator 610 and discriminator 612. For example, the generative machine learning engine 604 may pass the sets of historic map tiles 606a-606n and historic map tile types 608a-608n through the generator 610 to generate a set of generated map tiles 614a-614n. Each set of the generated map tiles 614a-614n may include any number of generated map tiles.

The generator 610 may then pass the generated map tiles 614a-614n to the discriminator 612. The discriminator 612 may also receive the sets of historic map tiles 606a-606n. Using both sets of data (e.g., 606a-606n and 614a-614n), the discriminator 612 may attempt to determine which map tiles are not members of the sets of historic map tiles 606a-606n. For example, the discriminator 612 may analyze each map tile included in the first set of historic map tiles 606a and each map tile included in the first set of generated map tiles 614a. The discriminator 612 may determine characteristics of the map tiles that are consistent, such as road placement, landmark placement, location names, etc. from which the discriminator may attempt to determine one or more map tiles that deviate from the consistent characteristics. Should the discriminator 612 analyze a particular map tile that includes characteristics that deviate beyond what the discriminator 612 expects a map tile describing the particular geographic region to have, the discriminator 612 may flag the particular map tile as a generated map tile. In that case, the discriminator 612 may return the flagged map tile to the generator 610, and/or otherwise indicate to the generator 610 that a map tile from a set of generated map tiles is not sufficiently similar to the set of historic map tiles representing the particular geographic region. The generator 610 may analyze the flagged map tile to determine the characteristics of the flagged map tile that resulted in the tile being flagged. Thus, in future iterations of the generative machine learning process, the generator 610 may alter the map tile generation process to avoid a similar flagging result from the discriminator 612.

In this manner, the generative machine learning engine 604 may progressively generate map tiles that correspond more closely to the sets of historic map tiles for any particular geographic region (e.g., sets of historic map tiles 606a-606n). Therefore, in the case where a user requests map data corresponding a geographic region and the system (e.g., via the map tile suggestion module 140) determines that the map tile database 130 does not include a map tile of the particular geographic region corresponding to a preferred/determined map tile type, the engine 604 may generate a map tile of the preferred/determine map tile type for the particular geographic region for display to the user.

Figure 6B:
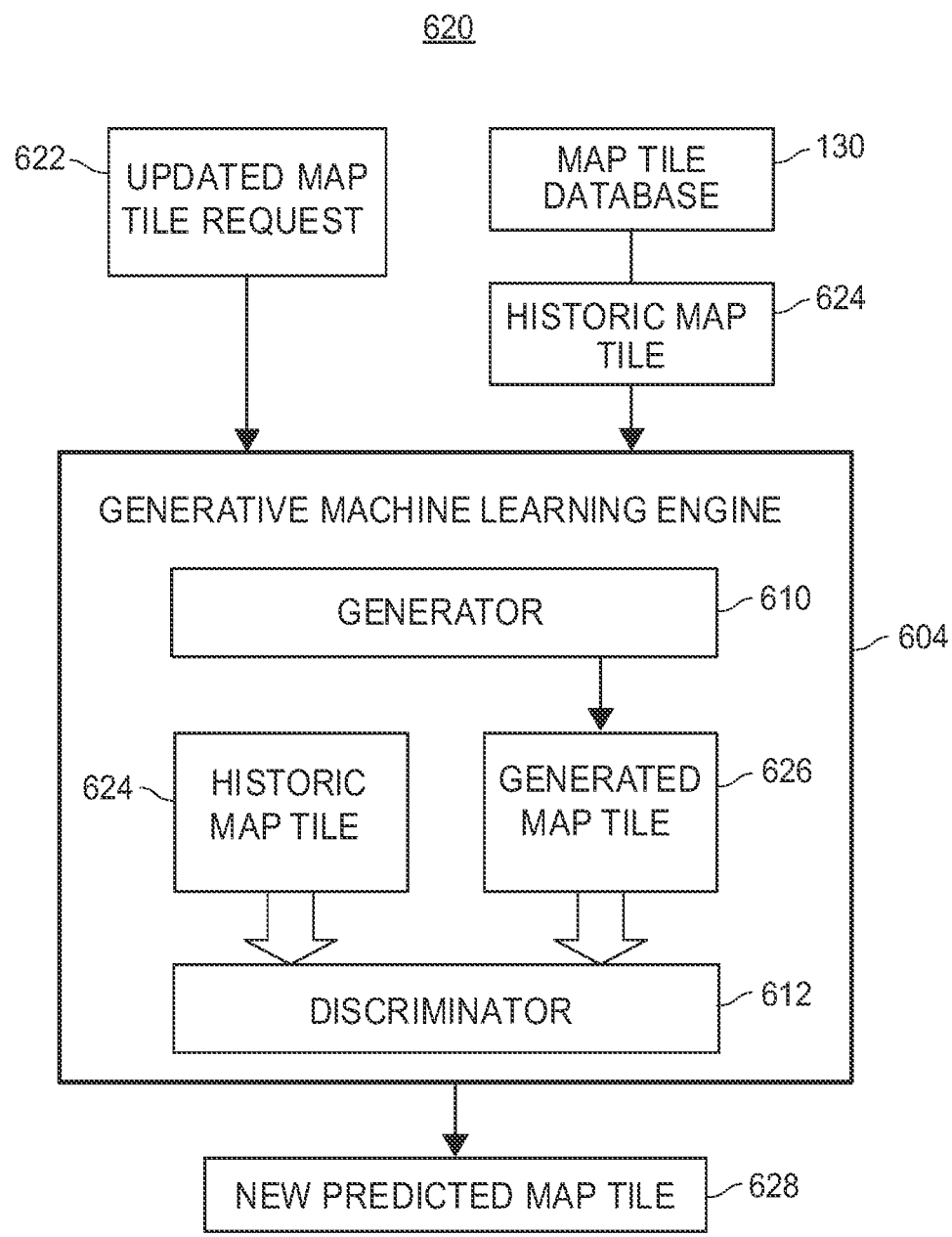
FIG. 6B is a combined block and logic diagram that illustrates the selective generation of new map tiles based on user context using the generative machine learning model.

To illustrate, and as shown in the example request scenario 620 of FIG. 6B, the generative machine learning engine 604 may receive data indicative of a request to generate a new map tile. The engine 604 may receive an updated map tile request 622. The updated map tile request 622 may include data indicative of the map tile type (e.g., "terrain," "satellite," etc.) the engine 604 should generate. For example, a user may scroll over a particular geographic region that does not have an associated "terrain" type map tile. Upon user request, or based on the user contextual data, the system (e.g., server 101) may attempt to retrieve a "terrain" type map tile for the particular geographic region, and may fail. Thus, an updated map tile request 622 may be transmitted to the generative learning machine 604, and the request 622 may indicate that the map tile the engine 604 should generate is a "terrain" type map tile for the particular geographic region.

Accordingly, the engine 604 may retrieve historic map tiles 624 from the map tile database 130 to use in the generation process. The engine 604 may retrieve these historic map tiles 624 after receiving the updated map tile request 622. It should be understood that the historic map tile 624 may include one or more historic map tiles. Regardless, once the engine 604 receives both the updated map tile request 622 and the historic map tile 624, the engine 604 may proceed with the map tile generation process.

The engine 604 may first pass both the updated map tile request 622 and the historic map tile 624 to the generator 610. The generator 610 may then analyze the historic map tile(s) 624 in conjunction with the map tile type included in the updated map request 622 to generate a generated map tile 626. As previously mentioned, the generated map tile 626 may be an approximate representation of the particular geographic region in the map tile type indicated in the updated map request 622. In reference to the prior example, the generator 610 may generate the "terrain" map tile for the particular geographic region, despite not having a "terrain" type map tile to use for reference. The generated map tile 626 and historic map tile(s) 624 may then be sent to the discriminator 612 for comparison.

Thus, the engine 604 may transmit the generated map tile 626 and the historic map tile(s) 624 to the discriminator 612. The discriminator 612 may receive the map tiles (624, 626), and attempt to determine which map tiles are not members of the historic map tile(s) 624. As mentioned previously, the discriminator 612 may analyze each map tile included in the historic map tile(s) 624 and the generated map tile 626. The discriminator 612 may determine characteristics of the map tiles that are consistent, such as road placement, landmark placement, location names, etc. from which the discriminator may attempt to determine one or more map tiles that deviate from the consistent characteristics. If the discriminator 612 analyzes the generated map tile 626 and determines that the generated map tile 626 includes characteristics that deviate beyond what the discriminator 612 expects a map tile describing the particular geographic region to have, the discriminator 612 may flag the generated map tile 626, as described above. However, should the discriminator 612 not flag the generated map tile 626, the engine 604 may determine that the generated map tile 626 should be transmitted to the user for display. Accordingly, the engine 604 may designate the generated map tile 626 as the new predicted map tile 628, and transmit the new predicted map tile 628 to the user for display (e.g., via the client device 102).

It should be appreciated that the generator 610 may generate and the discriminator 612 may flag a plurality of generated map tiles 626 for any particular updated map tile request 622. For example, a generated map tile 626 may be flagged by the discriminator 612. In that instance, the generator 610 may receive an indication that the generated map tile 626 was flagged by the discriminator 612, and the generator 610 may generate a subsequent generated map tile 626. In embodiments, this may occur multiple times until the generator 610 generates a generated map tile 626 that is not flagged by the discriminator 612.

Example Methods for Suggesting Map Tiles

Figure 7:
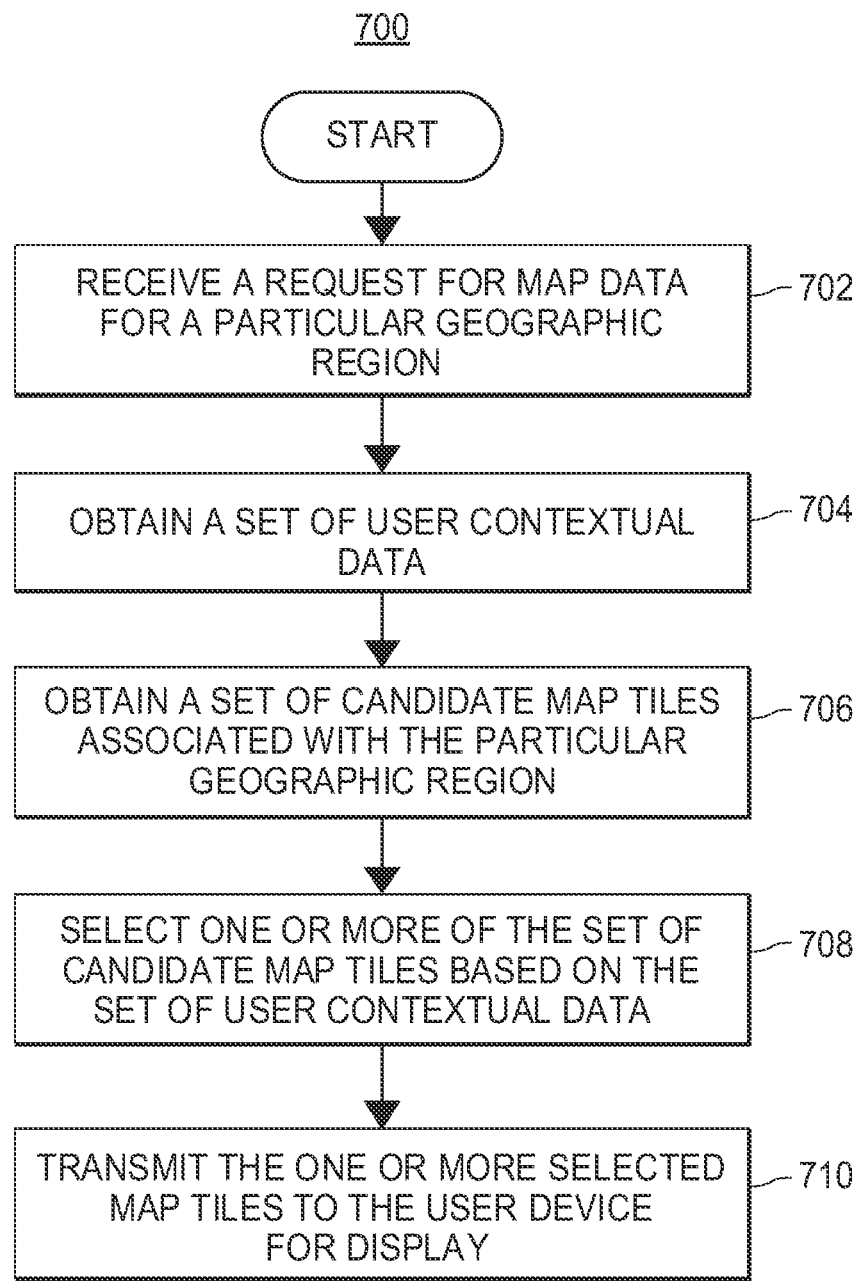
FIG. 7 is a flow diagram of an example method for selectively suggesting and/or generating map tiles based on user context, which can be implemented in a computing device that operates in, or cooperates with, a context-aware map tile suggestion and/or generation system.

FIG. 7 illustrates a flow diagram of an example method 700 for suggesting map tiles for display to a user. The method can be implemented in a set of instructions stored on a computer-readable memory and executable at one or more processors of the server device 101. For example, the method can be implemented by the map tile suggestion module 140.

At block 702, one or more processors (e.g., CPU 144) may receive a request from a user device (e.g., client device 102) for map data for a particular geographic region. A user may manually request map data, and/or the user device may automatically transmit a request for map data. For example, a user may manually request map data by interacting with a user control appearing on the map display, a text box appearing on the map display, and/or any other suitable indication. Moreover, the user device may automatically transmit a request for map data when a user is scrolling across a map display and encounters the particular geographic region.

Regardless, once the one or more processors receive the request for the map data for the particular region, the one or more processors may obtain a set of user contextual data (block 704). In embodiments, the set of user contextual data may include at least one of (i) a set of current user activity data indicative of a user travelling, the user planning a trip, or the user using a mapping application; (ii) a current date; (iii) a current time; (iv) a weather forecast; (v) a set of location metadata associated with the particular geographic region; (vi) a set of connectivity data indicative of a current status of a communication network in which the user device communicates; (vii) a set of battery life data indicative of a current battery status of the user device; and/or any combination thereof. For example, the user device may access GPS data to determine the user is currently traveling, and the user device may access a calendar associated with the user to retrieve data indicating that the user intends to hike today.

The one or more processors may then obtain a set of candidate map tiles associated with the particular geographic region (block 706). In embodiments, the set of candidate map tiles may include (i) a terrain map tile, (ii) a satellite image map tile, (iii) a hybrid map tile, (iv) a standard map tile, and/or any combination thereof. Once the one or more processors obtain the set of candidate map tiles, the one or more processors may select one or more of the candidate map tiles based on the set of user contextual data (block 708).

In embodiments, the one or more processors may determine a type of map tile for the set of user contextual data. In reference to the prior example, the one or more processors may analyze the set of user contextual data and select the "terrain" map tile type because the user may be currently traveling to hike and may prefer to view the topography of the particular geographic region. The one or more processors may then identify one or more of the set of candidate map tiles corresponding to the determined type of map tile. If at least one candidate map tile of the set of candidate map tiles is the determined type of map tile, the one or more processors may transmit the selected map tile to the user device for display (block 710).

However, in embodiments, the one or more processors may determine that, for at least a portion of the particular geographic region, there is no map tile of the set of candidate map tiles corresponding to the determined type of map tile. In these instances, the one or more processors may need to generate a new map tile corresponding to the determined type of map tile. Thus, as previously described in reference to FIGS. 6A and 6B, the one or more processors may train a generative machine learning model (e.g., generative machine learning engine 604) in order to generate the new map tile. The one or more processors may train the generative machine learning model using (i) a plurality of previously generated map tiles, (ii) a set of indications of a corresponding type of each of the plurality of previously generated map tiles, and/or any combination thereof.

Once the one or more processors train the generative machine learning model, the one or more processors may obtain a historic map tile corresponding to the portion of the particular geographic region, and apply the data indicating the determined type of map tile and the historic map tile to the generative machine learning model. The generative machine learning model may then generate the new map tile corresponding to the determined type of map tile based on the historic map tile and the data indicating the determined type of map tile. Correspondingly, the one or more processors may then transmit the new map tile to the user device for display.

In embodiments, the one or more processors may train a machine learning model using (i) a plurality of map tiles previously displayed on user devices, and for each of the plurality of map tiles, (ii) user contextual data for the map tile, and (iii) an indication of whether a user requested a different map tile in response to displaying the map tile. The one or more processors may then apply the machine learning model to the set of candidate map tiles and the set of user contextual data to select one or more of the set of candidate map tiles.

Additionally or alternatively in these embodiments, the one or more processors may apply the machine learning model to the set of candidate map tiles and the set of user contextual data to determine a confidence score for each map tile of the set of candidate map tiles. The confidence score may indicate, for example, the predicted relevance of a respective map tile of the set of candidate map tiles based on the set of user contextual data. As an illustration, and in reference to the prior hiking example, a terrain map tile may have a high confidence score based on the user contextual data (e.g., GPS data indicating the user is currently traveling, and data indicating that the user intends to hike today). By contrast, a satellite map tile may have a lower confidence score than the terrain map tile based on the user contextual data. Regardless, the one or more processors may compare the respective confidence scores for each map tile to rank the set of candidate map tiles. The map tile of the set of candidate map tiles with the highest confidence score may be transmitted to the user device for display.

In embodiments, the one or more processors may rank the set of candidate map tiles in accordance with the set of user contextual data. For example, the set of user contextual data may contain tags that associate the set of user contextual data with particular types of map tiles. In reference to the prior hiking example, the data indicating that the user intends to hike today may contain a tag associating that data with a "terrain" type of map tile. In any event, the one or more processors may select one or more highest ranked map tiles in the set of candidate map tiles for transmission to the user device for display.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 700 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 700 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the method 700 can be utilized with other objects and user interfaces. Furthermore, although the explanation above describes steps of the method 700 being performed by specific devices (such as a server device 101 or client computing device 102), this is done for illustration purposes only. The blocks of the method 700 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing dynamic generation and suggestion of map tiles based on user context through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for selectively generating map tiles based on user context, the method comprising:
   receiving, at one or more processors from a user device, a request for map data for a particular geographic region;
   obtaining, by the one or more processors, a set of user contextual data;
   obtaining, by the one or more processors, a set of candidate map tiles associated with the particular geographic region;
   selecting, by the one or more processors, one or more of the set of candidate map tiles based on the set of user contextual data by:
      determining, by the one or more processors, a type of map tile from a set of map tile types for the set of user contextual data, each type of map tile in the set of map tile types corresponding to a distinct visual representation of a geographic region depicted by a respective map tile, and the type of map tile being at least one of: (i) a standard map tile, (ii) a terrain map tile, (iii) a satellite map tile, or (iv) a hybrid map tile,
      identifying, by the one or more processors, the one or more of the set of candidate map tiles corresponding to the type of map tile;
      ranking, by the one or more processors, the set of candidate map tiles in accordance with the set of user contextual data and the type of map tile, and
      selecting, by the one or more processors, the one or more of the set of candidate map tiles based on the one or more of the set of candidate map tiles being one or more highest ranked map tiles in the set of candidate map tiles; and
   transmitting, by the one or more processors, the one or more selected map tiles to the user device for display.

2. The method of claim 1, further comprising:
   training, by the one or more processors, a machine learning model using (i) a plurality of map tiles previously displayed on user devices, and for each of the plurality of map tiles, (ii) user contextual data for the map tile, and (iii) an indication of whether a user requested a different map tile in response to displaying the map tile; and
   applying, by the one or more processors, the machine learning model to the set of candidate map tiles and the set of user contextual data to select one or more of the set of candidate map tiles.

3. The method of claim 2, wherein selecting one or more of the set of candidate map tiles based on the set of user contextual data includes:
   applying, by the one or more processors, the machine learning model to the set of candidate map tiles and the set of user contextual data to determine a confidence score for each map tile of the set of candidate map tiles; and comparing, by the one or more processors, the respective confidence scores for each map tile to rank the set of candidate map tiles.

4. The method of claim 1, further comprising:
for at least a portion of the particular geographic region, determining, by the one or more processors, that there is no map tile of the set of candidate map tiles corresponding to the determined type of map tile;
generating, by the one or more processors, a new map tile corresponding to the determined type of map tile including:
obtaining, by the one or more processors, a historic map tile corresponding to the portion of the particular geographic region; and
applying, by the one or more processors, data indicating the determined type of map tile and the historic map tile to a generative machine learning model to generate the new map tile corresponding to the determined type of map tile based on the historic map tile and the data indicating the determined type of map tile; and
transmitting, by the one or more processors, the new map tile to the user device for display.

5. The method of claim 4 further comprising training, by the one or more processors, the generative machine learning model using (i) a plurality of previously generated map tiles, and (ii) indications of a corresponding type of each of the plurality of previously generated map tiles.

6. The method of claim 1, wherein the set of user contextual data includes at least one of: (i) current user activity data indicative of a user travelling, the user planning a trip, or the user using a mapping application; (ii) a current date; (iii) a current time; (iv) a weather forecast; (v) a set of location metadata associated with the particular geographic region; (vi) connectivity data indicative of a current status of a communication network in which the user device communicates; or (vii) battery life data indicative of a current battery status of the user device.

7. The method of claim 1, wherein the set of candidate map tiles includes at least one of: (i) a terrain map tile, (ii) a satellite image map tile, or (iii) a hybrid map tile.

8. A server device for selectively generating map tiles based on user context, the server device comprising:
one or more processors; and
a non-transitory computer-readable memory coupled to the one or more processors and storing instructions thereon that, when executed by the one or more processors, cause the server device to:
receive from a user device a request for map data for a particular geographic region;
obtain a set of user contextual data;
obtain a set of candidate map tiles associated with the particular geographic region;
select one or more of the set of candidate map tiles based on the set of user contextual data by:
determining a type of map tile from a set of map tile types for the set of user contextual data, each type of map tile in the set of map tile types corresponding to a distinct visual representation of a geographic region depicted by a respective map tile, and the type of map tile being at least one of: (i) a standard map tile, (ii) a terrain map tile, (iii) a satellite map tile, or (iv) a hybrid map tile, and
identifying one or more of the sets of candidate map tiles corresponding to the type of map tile;
ranking the set of candidate map tiles in accordance with the set of user contextual data and the type of map tile, and
selecting the one or more of the set of candidate map tiles based on the one or more of the set of candidate map tiles being one or more highest ranked map tiles in the set of candidate map tiles; and
transmit the one or more selected map tile to the user device for display.

9. The server device of claim 8, wherein the instructions further cause the server device to:
train a machine learning model using (i) a plurality of map tiles previously displayed on user devices, and for each of the plurality of map tiles, (ii) user contextual data for the map tile, and (iii) an indication of whether a user requested a different map tile in response to displaying the map tile of the plurality of map tiles; and
apply the machine learning model to the set of candidate map tiles and the set of user contextual data to select one or more of the set of candidate map tiles.

10. The server device of claim 9, wherein the instructions further cause the server device to:
apply the machine learning model to the set of candidate map tiles and the set of user contextual data to determine a confidence score for each map tile of the set of candidate map tiles; and
compare the respective confidence scores for each map tile to rank the set of candidate map tiles.

11. The server device of claim 8, wherein the instructions further cause the server device to:
for at least a portion of the particular geographic region, determine that there is no map tile of the set of candidate map tiles corresponding to the determined type of map tile;
generate a new map tile corresponding to the determined type of map tile including:
train a generative machine learning model using (i) a plurality of previously generated map tiles, and (ii) indications of types of each of the plurality of previously generated map tiles;
obtain a historic map tile corresponding to the portion of the particular geographic region; and
apply the historic map tile to the generative machine learning model to generate the new map tile corresponding to the determined type of map tile based on the historic map tile and the plurality of previously generated map tiles; and
transmit the new map tile to the user device for display.

12. A non-transitory computer-readable medium storing instructions for selectively generating map tiles based on user context that, when executed by one or more processors in a computing device, cause the one or more processors to:
receive from a user device a request for map data for a particular geographic region;
obtain a set of user contextual data;
obtain a set of candidate map tiles associated with the particular geographic region;
select one or more of the set of candidate map tiles based on the set of user contextual data by:
determining a type of map tile from a set of map tile types for the set of user contextual data, each type of map tile in the set of map tile types corresponding to a distinct visual representation of a geographic region depicted by a respective map tile, and the type of map tile being at least one of: (i) a standard map tile, (ii) a terrain map tile, (iii) a satellite map tile, or (iv) a hybrid map tile, identifying one or more of the sets of candidate map tiles corresponding to the type of map tile; and rank the set of candidate map tiles in accordance with the set of user contextual data;

select one or more highest ranked map tiles in the set of candidate map tiles, and transmit the one or more selected map tile to the user device for display.

13. The non-transitory computer-readable medium of claim 12, wherein the instructions further cause the one or more processors to:

train a machine learning model using (i) a plurality of map tiles previously displayed on user devices, and for each of the plurality of map tiles, (ii) user contextual data for the map tile, and (iii) an indication of whether a user requested a different map tile in response to displaying the map tile of the plurality of map tiles; and apply the machine learning model to the set of candidate map tiles and the set of user contextual data to select one or more of the set of candidate map tiles.

14. The non-transitory computer-readable medium of claim 13, wherein the instructions further cause the one or more processors to:

apply the machine learning model to the set of candidate map tiles and the set of user contextual data to determine a confidence score for each map tile of the set of candidate map tiles; and compare the respective confidence scores for each map tile to rank the set of candidate map tiles.

15. The non-transitory computer-readable medium of claim 12, wherein the instructions further cause the one or more processors to:

for at least a portion of the particular geographic region, determine that there is no map tile of the set of candidate map tiles corresponding to the determined type of map tile;

generate a new map tile corresponding to the determined type of map tile including:

train a generative machine learning model using (i) a plurality of previously generated map tiles, and (ii) indications of types of each of the plurality of previously generated map tiles;

obtain a historic map tile corresponding to the portion of the particular geographic region; and apply the historic map tile to the generative machine learning model to generate the new map tile corresponding to the determined type of map tile based on the historic map tile and the plurality of previously generated map tiles; and transmit the new map tile to the user device for display.

* * * * *